United States Patent [19]
Corriveau et al.

[11] Patent Number: 6,058,769
[45] Date of Patent: May 9, 2000

[54] ASSEMBLY AND METHOD FOR POSITIONING A MEASUREMENT PROBE PROXIMATE A TEST BODY DISPOSED FOR A FLUID TUNNEL TEST

[75] Inventors: Pierre J. Corriveau; Richard E. Dooley, both of Portsmouth; Stanley J. Polhemus, Jr., Wakefield, all of R.I.; William S. Wilkinson, Dartmouth, Mass.

[73] Assignee: The United States of America as represented by the Secretary of the Navy, Washington, D.C.

[21] Appl. No.: 09/335,820

[22] Filed: Jun. 18, 1999

[51] Int. Cl.⁷ ........................................................ G01L 5/16
[52] U.S. Cl. ................................................................ 73/147
[58] Field of Search ................................. 73/147, 865.6, 73/865.8, 866.5

[56] References Cited

U.S. PATENT DOCUMENTS 4,188,822  2/1980  Schoenherr et al. ....................... 73/147
5,056,361  10/1991  Roberts ....................................... 73/147

OTHER PUBLICATIONS

Kelly et al., "The General Motors Engineering Staff Aerodynamics Laboratory—A Full–Scale Automotive Wind Tunnel"; SAE 820371; Feb. 22–26, 1982; SAE of Warrendale, PA; pp. 1–18.

*Primary Examiner*—Robert Raevis
*Attorney, Agent, or Firm*—Michael J. McGowan; James M. Kasischke; Prithvi C. Lall

[57] ABSTRACT

An assembly for positioning a measurement probe proximate a test body disposed for a fluid tunnel test includes a frame having a forward frame portion for attachment to a fluid flow tunnel fluid outlet, an aft frame portion aligned with the forward frame portion, and axial support members interconnecting the forward and aft frame portions. The assembly further includes a probe mount portion having a base slidably mounted on one or more of the axial support members, a probe supporting strut mounted on the base, and a probe mounted in the strut and movable in directions radially of the frame, and a probe moving member for moving the probe radially inwardly and outwardly of the frame portions.

14 Claims, 5 Drawing Sheets

ASSEMBLY AND METHOD FOR POSITIONING A MEASUREMENT PROBE PROXIMATE A TEST BODY DISPOSED FOR A FLUID TUNNEL TEST

STATEMENT OF GOVERNMENT INTEREST

The invention described herein may be manufactured and used by or for the Government of the United States of America for governmental purposes without the payment of royalties thereon or therefor.

BACKGROUND OF THE INVENTION (1) Field of the Invention

The invention relates to an assembly and method for holding and positioning a measurement instrument, and is directed more particularly to an assembly and method for holding and positioning a measurement probe close to a test body disposed for a fluid tunnel test, such as a wind tunnel test, or the like.

(2) Description of the Prior Art

It is known to determine hydrodynamic performance of a marine body, such as a vehicle hull, a torpedo, a mine, submersibles, and the like, by making a series of anemometry and pressure measurements around the test body in a controlled wind stream. The results are scaled, through a "Reynolds Number" correlation, to performance in the water. Inasmuch as an air tunnel generally requires less space and maintenance than a water-filled test tank, the use of air tunnels for determining hydrodynamic performance of marine bodies is attractive.

The cross-sectional geometry of many underwater vehicles is circular. Also, the cross section of many wind-tunnel wind delivery outlets is circular. Thus, there often is required a circle of measurement probes around the test body, usually mounted on arms extending into the test tunnel wind stream to map out the flow behaviors around the portions of the body under study. It is further required to produce such "maps" along the axial length of the test body portion under study.

Inasmuch as each measurement probe interferes with the air flow near the test body, the larger the number of probes used to acquire a complete picture, the more interference with normal flow is experienced. Thus, in an effort to obtain a more complete picture, one may, by overuse of probes, actually decrease the accuracy of the picture.

There is, therefore, a need for a system and method for mounting a modest number of probes which are readily and easily movable along the axis of the test body and radially and circumferentially of the test body, such that the modest number of probes provide the information heretofore obtained from a large number of probes, but without significant interference with fluid flow around the test body.

SUMMARY OF THE INVENTION

Accordingly, an object of the invention is to provide an assembly and method for positioning one or more measurement probes near a test body disposed for a fluid tunnel test, the probe being adapted for movement axially of the test body and radially and circumferentially of the test body to effect measurement in a number of selected locations.

With the above and other objects in view, as will hereinafter appear, a feature of the present invention is the provision of an assembly for positioning a measurement probe proximate a test body disposed for a fluid tunnel test. The assembly includes a frame comprising a forward frame portion for attachment to a fluid flow tunnel fluid outlet, an aft frame portion aligned with the forward frame portion, and axial support members interconnecting the forward and aft frame portions. The assembly further includes a probe mount portion comprising a base slidably mounted on one or more of the axial support members, a probe supporting strut mounted on the base, and a probe disposed in the strut and movable in directions radially of the frame, and a probe moving means for moving the probe radially inwardly and outwardly of the frame.

In accordance with a further feature of the invention, there is provided a method for positioning a measurement probe proximate a test body disposed for a fluid tunnel test. This method includes the step of placing a strut on which the probe is mounted on a support member extending alongside and removed from the test body, such that the strut extends radially inwardly toward an axis of the test body. The strut can then be slid along the support member to a location abreast of a selected point on the test body axis. The probe can be moved axially of the strut and radially of the test body axis to place the probe a selected distance radially from the test body. The strut can also be moved circumferentially about the test body axis to place the probe at a selected location circumferentially of the test body.

The above and other features of the invention, including various novel details of construction and combinations of parts and method steps, will now be more particularly described with reference to the accompanying drawings and pointed out in the claims. It will be understood that the particular device and method embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENT

Figure 1:
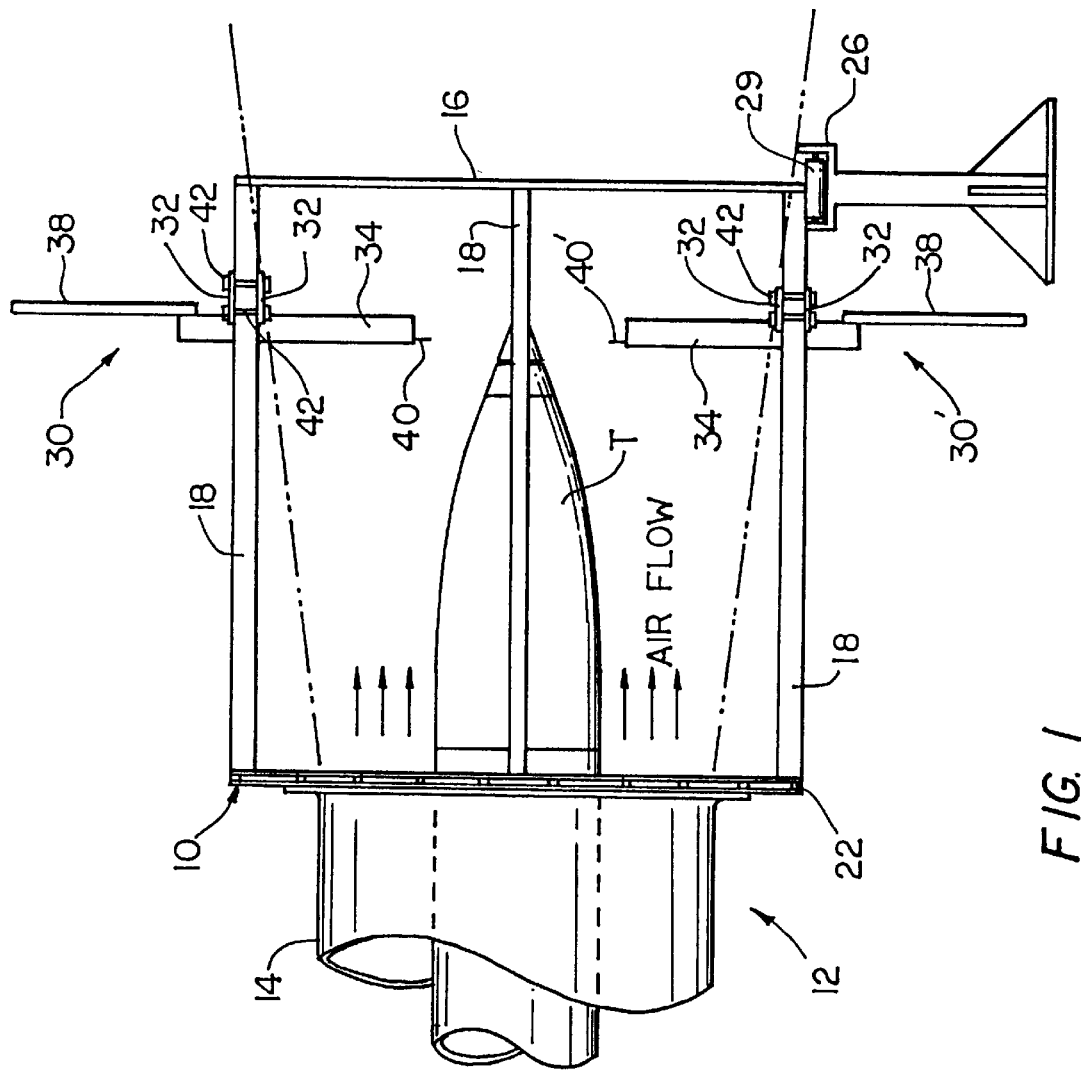
FIG. 1 is a side elevational and diagrammatic view of an assembly for positioning a measurement probe, which assembly is illustrative of an embodiment of the invention.
Figure 2:
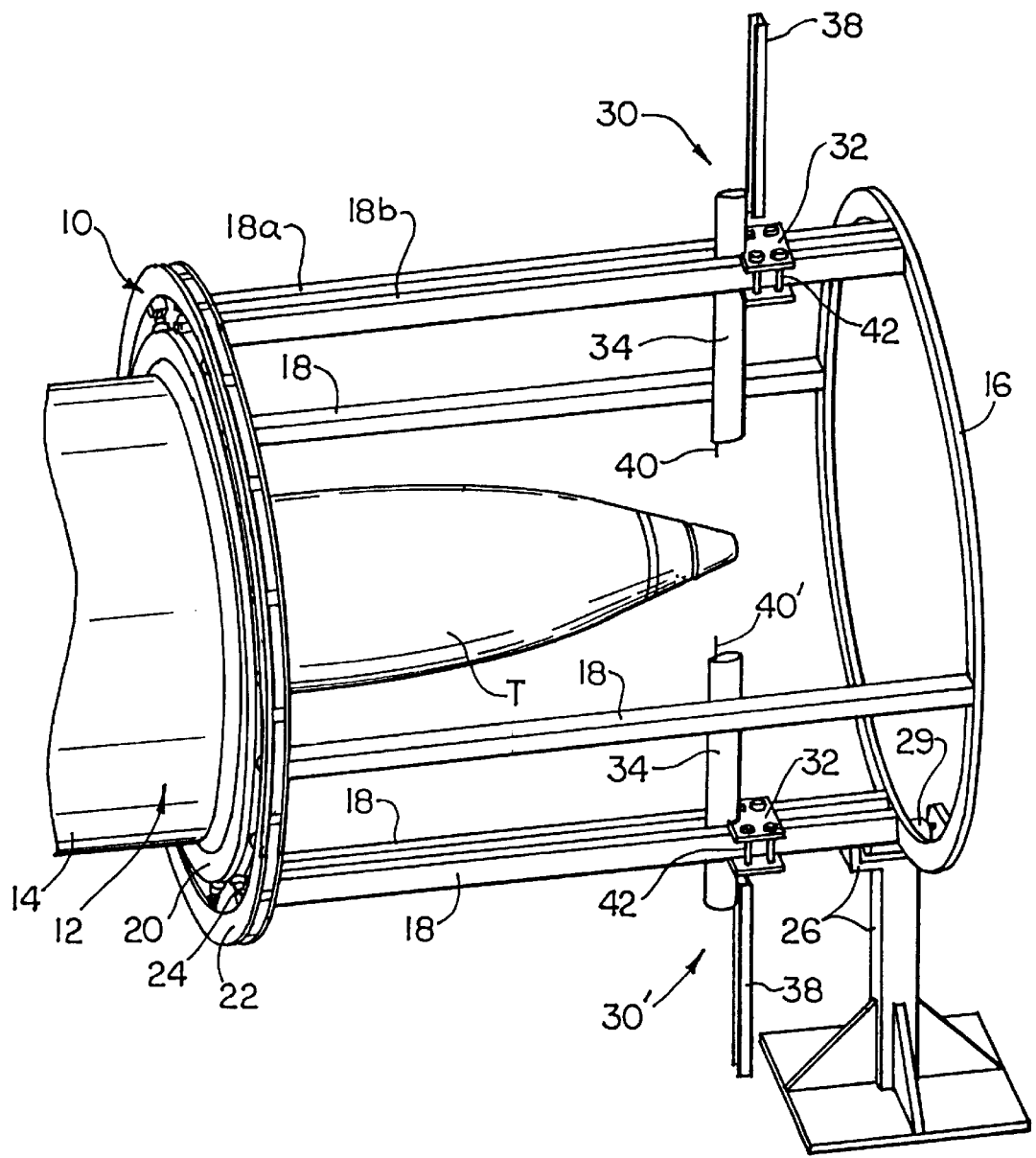
FIG. 2 is a perspective view of the assembly of FIG. 1.

Referring to FIG. 1, it will be seen that an illustrative embodiment of the assembly includes a forward frame portion, shown in the form of a forward ring assembly 10 for mounting on the outlet end 12 of a fluid tunnel, such as a wind tunnel 14. An aft ring 16 is in alignment with forward ring assembly 10, and is connected to forward ring assembly 10 by axial support members 18, disposed such that at least two of the support numbers 18 (18a, 18b) are in a side-by-side disposition (FIG. 2).

Figure 5:
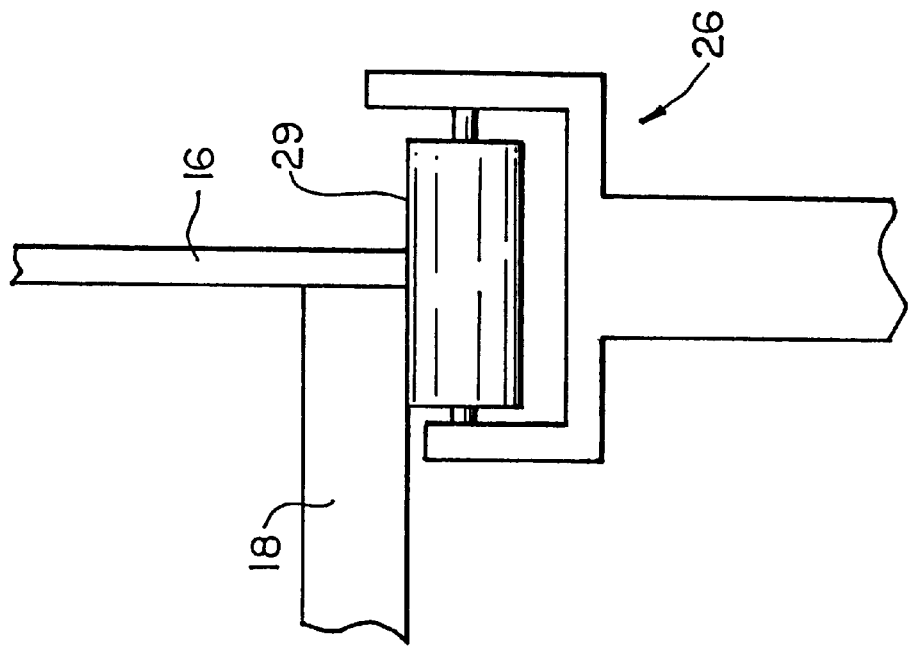
FIG. 5 is an enlarged side elevational view of an aft ring support portion of the assembly of FIG. 1.

The forward ring assembly 10 includes an inner bearing race 20, which is mounted on wind tunnel outlet end 12, and an outer bearing race 22 having mounted therein a multiplicity of ball casters 24 (FIG. 3) which ride in inner bearing race 20. Referring to FIG. 4, it will be seen that the ball casters 24 each include a roller 27 and a roller mount 28. The roller mounts 28 are fixed on the outer bearing race 22 and the rollers 27 are disposed for rocking movement in the inner bearing race 20. The aft ring 16 is mounted in an aft ring roller support 26 which maintains rigidity of the frame but permits rotational movement of aft ring 16. Referring to FIG. 5, it will be seen that the roller support 26 includes a roller 29 on which rests the aft ring 16.

Figure 6:
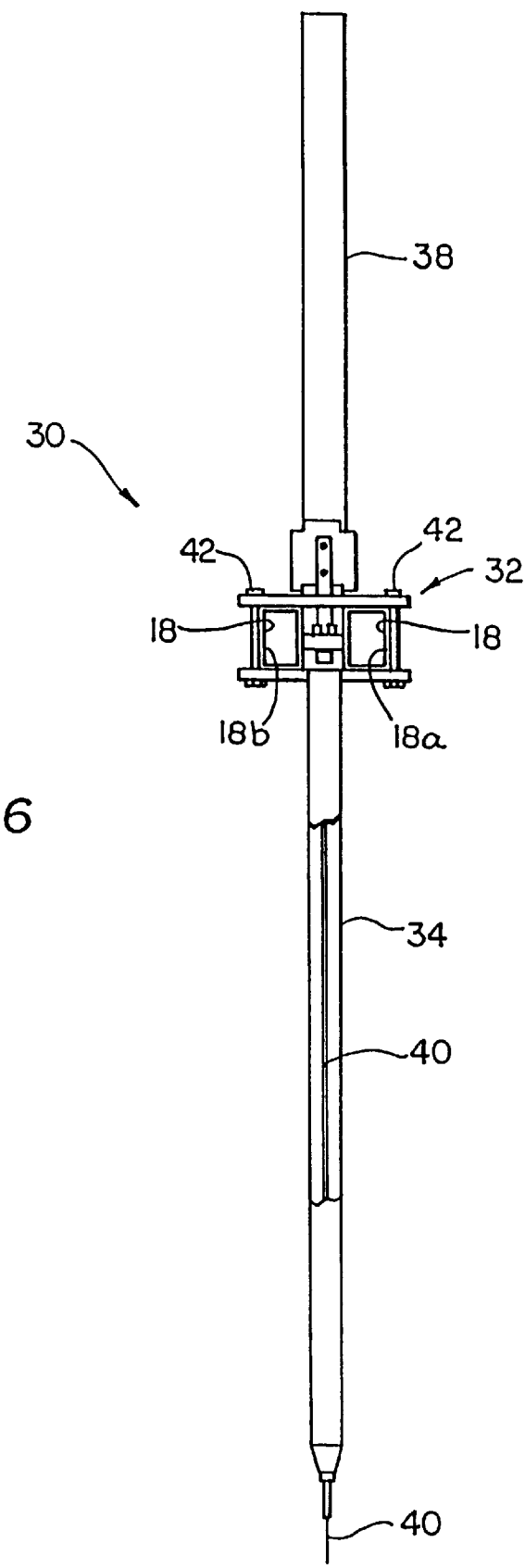
FIG. 6 is an enlarged aft end view of probe actuator, probe mount, probe supporting strut, and probe portions of the assembly of FIG. 1.

A probe mount portion 30 of the assembly includes a base member 32 slidably mounted on the side-by-side axial support members 18*a*, 18*b* (FIG. 6) for movement axially of the assembly. A probe-supporting strut 34 is mounted on base member 32 and extends radially inwardly of the assembly. The strut 34 houses a probe 40 driven by a precision accuracy actuator 38 which is fixed to strut 34 and is operable to move the probe 40 axially in strut 34.

As an alternative, probe 40 can be fixed in strut 34, and actuator 38 can be fixed to member 32 to move strut 34 toward and away from test body T. This embodiment has the advantage of keeping probe 40 a preset distance from potential interference caused by strut 34. Movement of the probe 40 as in the prior embodiment is preferred because of probe 40 and actuator 38 standardization.

Preferably, the assembly includes a second probe mount portion 30' of the same structure as described immediately above and disposed 180° from the above-described probe mount portion 30.

Figure 3:
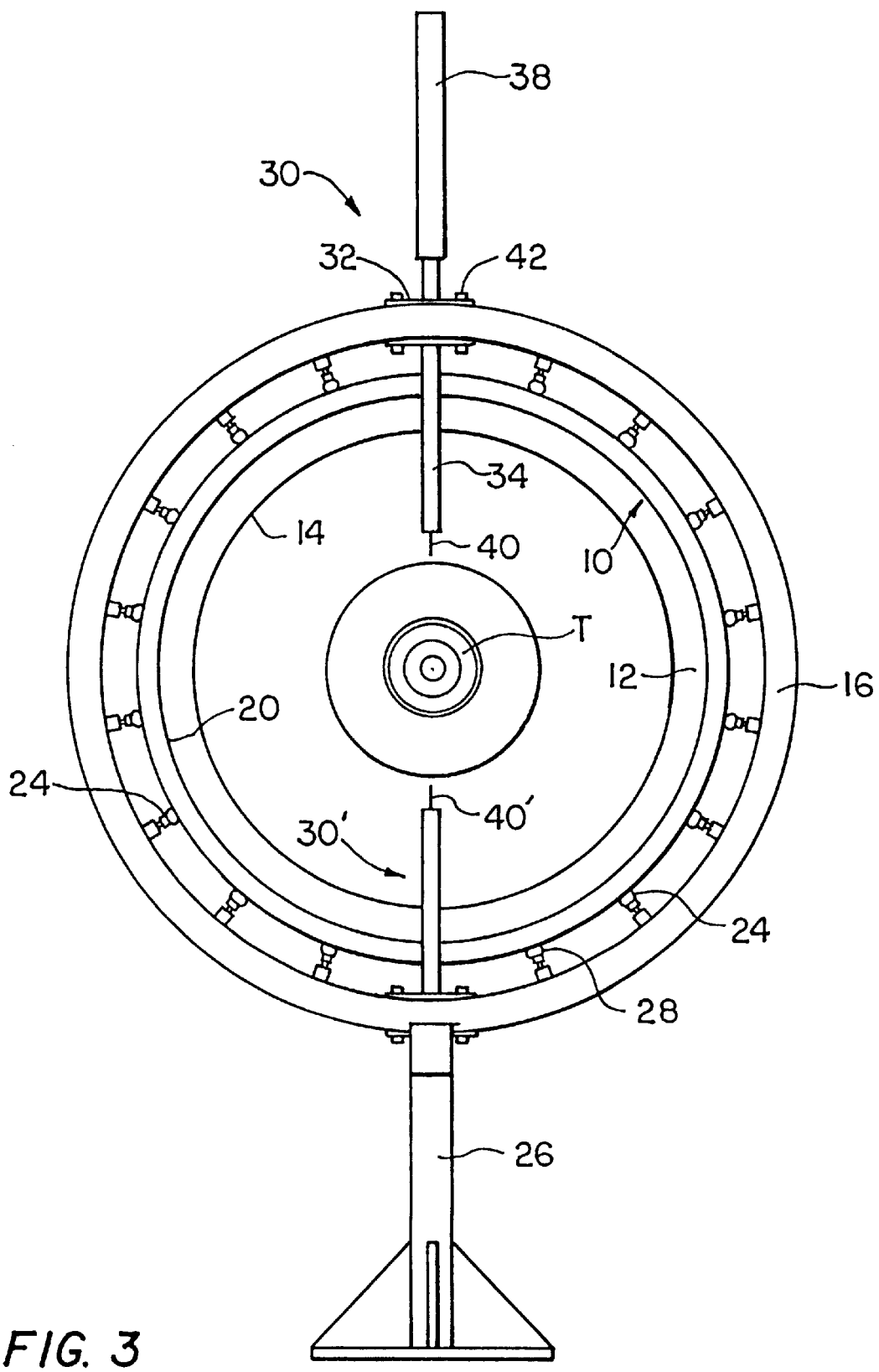
FIG. 3 in an aft end view of the assembly of FIG. 1.
Figure 4:
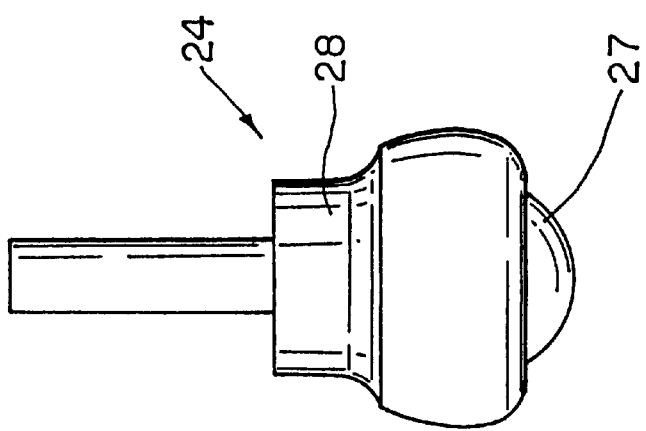
FIG. 4 is an enlarged elevational view of a ball caster of the type shown in FIG. 3.

In operation, a test body T, such as a torpedo, is placed in a fluid tunnel 14, such as a wind tunnel, as shown in FIGS. 1–3, with a portion of test body T undergoing examination protruding from outlet end 12 of wind tunnel 14. As illustrated in FIGS. 1–3, test body T is the after end of a torpedo (without propeller) positioned for test.

The forward ring assembly 10 is secured to the outlet end 12 of the wind tunnel 14. The aft ring 16 is set in aft ring roller support 26. The probe mount portion 30, including the base member 32, strut 34, actuator 38, and probe 40 are mounted on side-by-side axial support members 18*a*, 18*b*. It will be apparent that a base member 32 can be provided for attachment to a single axial support member 18 without affecting the operation of the assembly. It has been found convenient to use two axial support members 18 for mounting of base member 32, but such is not necessary.

The probe mount portion 30 of the assembly is slid along axial support members 18*a*, 18*b* until the desired point along the axis of test body T is reached, at which point bolts 42 on base member 32 are tightened to lock probe 40 in a desired location along the axis of the test body.

The precision accuracy actuator 38, preferably motor-driven, is actuated to move probe 40 axially in strut 34, to a point at a desired radial distance from the test body portion T. Tests are then run and measurements taken at the point at which the desired axial and radial positions coincide. If there is a second probe 40', measurements at two locations are taken simultaneously, if desired.

To obtain further measurements at the same axial positions, and same radial distance from the test body B, but at different circumferential locations, rings 16, 22 are rotated a desired number of degrees and further tests are undertaken. In this manner, a circle of test points are subjected to test at a given axial point and a given radial distance. The axial location of the probe may be changed by further sliding movement of the base member 32. The radial distance of the probe 40 from the test body T may be changed by operation of the actuator 38.

There is thus provided an assembly and method by which a multitude of test points may be subjected to tests by a minimal number of probes with minimal supporting structures, and therefore minimal interference with air flow around the test body.

It is to be understood that the present invention is by no means limited to the particular construction and method steps herein disclosed and/or illustrated in the drawings, but also comprises any modifications or equivalents within the scope of the claims.

What is claimed is:

1. An assembly for positioning a measurement probe proximate a test body disposed for a fluid tunnel test, said assembly comprising:

a frame comprising a forward frame portion for attachment to a fluid flow tunnel fluid outlet, an aft frame portion aligned with said forward frame portion, and axial support members interconnecting said forward and aft frame portions;

a probe mount portion comprising a base slidably mounted on at least one of said axial support members, a probe supporting strut mounted on said base, and extending radially of said frame portions;

a probe disposed in said strut; and a probe moving means for moving said probe inwardly and outwardly with respect to said frame.

2. The assembly in accordance with claim 1 wherein said forward frame portion comprises a forward ring assembly and said aft frame portion comprises an aft ring.

3. The assembly in accordance with claim 2 wherein said forward ring assembly comprises an inner bearing race, an outer bearing race, and ball casters disposed therebetween to permit said outer bearing race to rotate on said inner bearing race, said outer bearing race being connected to said aft ring by said axial support members.

4. The assembly in accordance with claim 3 further comprising an aft ring roller support for supporting said aft ring.

5. The assembly in accordance with claim 3 wherein at least one pair of said axial support members are disposed side-by-side and said probe mount portion base is slidably mounted on said side-by-side axial support members.

6. The assembly in accordance with claim 5 wherein two pairs of side-by-side axial support members are provided and are disposed about 180° apart, and a probe mount portion is mounted on each pair of side-by-side axial support members.

7. The assembly in accordance with claim 3 wherein said inner bearing race is adapted for attachment to said tunnel fluid outlet, and said rotation of said outer bearing race moves said probe mount portion circumferentially of the test body.

8. The assembly in accordance with claim 1 wherein said probe mount portion comprises an actuator in engagement with said probe and operative to extend said probe from said strut.

9. The assembly in accordance with claim 1 wherein said forward frame portion comprises a rotatable ring, said aft frame portion comprises a rotatable ring and said axial support member interconnects said rotatable rings and is movable circumferentially of the test body by rotation of said rings.

10. A method for positioning a measurement probe proximate a test body disposed for a fluid tunnel test, the method comprising the steps of:

placing a strut in which said probe is mounted on a support member extending alongside and removed from the test body, such that said strut extends radially inwardly toward an axis of the test body;

sliding said strut along said support member to a location abreast of a selected point on the test body axis;

moving said probe axially and radially of the test body axis to place said probe a selected distance radially from the test body; and moving said strut circumferentially of the test body axis to place said probe at a selected location circumferentially of the test body.

11. The method in accordance with claim 10 wherein said probe is movable relative to said strut and the step of moving said probe radially comprises moving said probe axially along said strut.

12. The method in accordance with claim 10 wherein said probe is fixed on said strut and the step of moving said probe comprises moving said strut radially with respect to said test body axis.

13. The method in accordance with claim 10 wherein said strut is mounted on a base, and the step of placing the strut on the support member comprises mounting said base slidably on said support member, and the step of moving said probe axially comprises moving said probe axially of said strut.

14. The method in accordance with claim 13 wherein said support member interconnects two rotatable rings and the step of moving said strut circumferentially of the test body comprises rotating said rings to move said strut circumferentially of the test body.

* * * * *